(12) United States Patent
Schneider et al.

(10) Patent No.: US 9,362,045 B2
(45) Date of Patent: Jun. 7, 2016

(54) SYSTEM HAVING PRIMARY CONDUCTOR AND MOVABLE COMPONENT FOR INDUCTIVE MOVEMENT ALONG PRIMARY CONDUCTOR

(75) Inventors: Bernhard Schneider, Oberhausen-Rheinhausen (DE); Micha Hilligardt, Bruchsal (DE); Jochen Mahlein, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 798 days.

(21) Appl. No.: 13/255,075

(22) PCT Filed: Feb. 24, 2010

(86) PCT No.: PCT/EP2010/001133
§ 371 (c)(1),
(2), (4) Date: Sep. 6, 2011

(87) PCT Pub. No.: WO2010/099888
PCT Pub. Date: Sep. 10, 2010

(65) Prior Publication Data
US 2012/0025605 A1 Feb. 2, 2012

(30) Foreign Application Priority Data

Mar. 3, 2009 (DE) .......................... 10 2009 013 103

(51) Int. Cl.
*B60L 1/00* (2006.01)
*H01F 38/14* (2006.01)
(Continued)

(52) U.S. Cl.
CPC ................ *H01F 38/14* (2013.01); *B60L 5/005* (2013.01); *H01F 27/38* (2013.01); *H02J 5/005* (2013.01); *H01F 30/04* (2013.01)

(58) Field of Classification Search
CPC ............. H02J 3/00; H02J 5/005; H01F 27/38; H01F 38/14; B60L 5/00

USPC ............................ 323/361; 336/180; 307/104
See application file for complete search history.

(56) References Cited

U.S. PATENT DOCUMENTS 4,926,753 A * 5/1990 Weiss .......................... 104/88.03
5,163,001 A * 11/1992 Luke, Jr. .......................... 701/23
(Continued)

FOREIGN PATENT DOCUMENTS

JP          09-065502        3/1997
WO    WO 2007126321 A1 *  11/2007    ............... H02J 3/00

OTHER PUBLICATIONS

Free Merriam-Webster Dictionary, Definition for the term floor, [online], [retrieved on May 27, 2014], Retrieved from the Internet: <URL: http://www.merriam-webster.com/dictionary/floor> pp. 1-3.*

(Continued)

*Primary Examiner* — Jared Fureman
*Assistant Examiner* — Duc M Pham
(74) *Attorney, Agent, or Firm* — Kenyon & Kenyon LLP

(57) ABSTRACT

A system having vehicles, each including a secondary coil for the inductive supply of the vehicle from a primary conductor system, wherein the secondary coil includes a coil core, which has at least one main limb, the secondary coil being made up of a first and a second coil, each composed of windings which enclose the main limb in each case, the first coil arranged such that the windings are connected in series, and the induction voltage arising at the coil corresponds to the sum of the individual voltages induced at all windings when the magnetic flux enclosed by an individual winding in the main limb always has the same direction, especially in each winding of the first coil, the second coil arranged such that the second coil is made up of a first type of windings, i.e., a first partial coil, and of a second type of windings.

16 Claims, 5 Drawing Sheets

(51) Int. Cl.
- *B60L 5/00* (2006.01)
- *H01F 27/38* (2006.01)
- *H02J 5/00* (2016.01)
- *H01F 30/04* (2006.01)

(56) References Cited

U.S. PATENT DOCUMENTS

| | | | |
|---|---|---|---|
| 5,821,638 A * | 10/1998 | Boys et al. | 307/104 |
| 6,089,362 A * | 7/2000 | Takasan et al. | 191/10 |
| 6,252,386 B1 | 6/2001 | Minami et al. | |
| 2009/0013899 A1 * | 1/2009 | Wolf et al. | 104/288 |
| 2010/0169034 A1 * | 7/2010 | Reid et al. | 702/64 |

OTHER PUBLICATIONS

International Preliminary Report on Patentability, issued in corresponding International Application No. PCT/EP2010/001133.

International Search Report, issued in corresponding International Application No. PCT/EP2010/001133.

Written Opinion, issued in corresponding International Application No. PCT/EP2010/001133.

* cited by examiner

SYSTEM HAVING PRIMARY CONDUCTOR AND MOVABLE COMPONENT FOR INDUCTIVE MOVEMENT ALONG PRIMARY CONDUCTOR

FIELD OF THE INVENTION

The present invention relates to a system having vehicles.

BACKGROUND INFORMATION

Vehicles which are able to be supplied inductively are generally known. In such a case, a vehicle is moved along a primary conductor and supplied by the primary conductor via a secondary coil.

SUMMARY

Example embodiments of the present invention provide a system having vehicles, with the goal of achieving greater complexity of transportation tasks.

Among features of example embodiments of the present invention of the system having vehicles are that it includes a secondary coil for the inductive supply of the vehicle from a primary conductor system installed in the system,
wherein
the secondary coil includes a coil core, which has at least one main limb,
the secondary coil being composed of a first and a second coil, each being made up of windings which enclose the main limb in each case,
the first coil being arranged such that
   the windings are connected in series, and
   the induction voltage arising at the coil corresponds to the sum of the individual voltages induced at all windings when the magnetic flux enclosed by an individual winding in the main limb always has the same direction, especially for each winding of the first coil,
the second coil being arranged such that
   the second coil is composed of a first type of windings, i.e., a first partial coil, and of a second type of windings, i.e., a second partial coil,
   all windings are connected in series, and
   the induction voltage arising at the second coil corresponds to the difference of the summation voltage of all individual voltages induced at the windings of the first type, and to the summation voltage of all individual voltages induced at the windings of the second type, when the magnetic flux enclosed by an individual winding in the main limb always has the same direction, in particular for each winding of the second coil.

In this context it is advantageous that an inductive supply from the primary conductor system is possible not only in a linear-type movement of the vehicle, but also in a movement in the area, that is to say, in a movement that deviates from the track-guided movement along the line of the primary conductor. In other words, if a plurality of primary conductors is installed in parallel, a switch from one primary conductor to the most proximate primary conductor is possible without total loss of the energy supply. In particular, the most proximate primary conductors having an opposite current direction are able to be energized, so that a supply via the first or via the second coil is possible.

This is so because in the transition from the first primary conductor to the adjacent primary conductor, flux periodically penetrates the region of the main limb lying between the partial coils of the second coil. While the flux in the main limb is then no longer uniform when viewed over its entire extension, and it is therefore also impossible to induce voltage at the first coil, voltage is inducible at the second coil since it is made up of two partial coils having an opposite sense of winding, so that voltage is able to be induced nevertheless.

The outputs of both coils, i.e., the first and the second coil, are able to be supplied to a rectifier, and their outputs are connectable in parallel. In this manner, a constantly available direct voltage with only few fluctuations is able to be provided in the transition of the vehicle from the range of the first primary conductor to that of the adjacent primary conductor.

By compensating the inductivities of the secondary coil with the aid of connected capacities which are adapted to the alternating current impressed on the primary conductor, high efficiency is achievable even when the clearance between the secondary coil and the most proximate primary conductor is variable.

In example embodiments, the coil core has a center limb pointing to the floor. This has the advantage of focusing the flux coming from the primary conductor system installed in the floor, which means that the magnetic resistance may be reduced, i.e., the inductive coupling is able to be improved, and thus the efficiency as well.

In example embodiments, the first and the second partial coil of the second coil are set apart from each other, in particular in the direction of the main limb. This has the advantage that magnetic flux which penetrates the main limb in the clearance region from the floor and is partially transmitted to the right and partially to the left in the main limb, i.e., which causes an unevenly directed flux in the main limb, produces an induction voltage at the series connection of the two partial coils nevertheless.

In example embodiments, a center limb is situated between the first and second partial coil of the second coil, in particular a center limb pointing in the direction of the floor. This has the advantage that the flux is concentrated and the efficiency is therefore improved.

In example embodiments, side limbs are situated at the ends of the main limb, in particular in such a way that the coil core has an E-shape, C-shape, or a U-shape, the open side pointing toward the floor. This advantageously allows an even better flux guidance.

In example embodiments, the first coil is made up of two or more partial coils. This has the advantage that the partial coils are able to be placed in front of and behind the center limb.

In example embodiments, the first and/or the second partial coil of the second coil once again are/is composed of two or more partial coils in each case. This has the advantage that it allows an individual compensation, and thus a reduction of the peak voltage occurring in the coils, i.e., a reduction of the insulation clearance between the partial coils and the coils.

In example embodiments, the first and the second partial coil of the second coil are of equal size, that is to say, they have the same number of windings. This has the advantage that, given a specified number of windings, the maximum voltages are inducible at the coils.

In example embodiments, the secondary coil is provided in capacity-compensated form, i.e., is connected in parallel or in series, such that the associated resonant frequency substantially corresponds to the/a, frequency of the alternating current impressed on the primary conductor. This has the advantage that high efficiency is achievable even if the clearance between primary conductor and secondary coil fluctuates.

In example embodiments, the partial coils are provided in compensated form in each case. This has the advantage that the peak voltage within and at the secondary coil is able to be kept low.

In example embodiments, the vehicle is substantially moved along the primary conductor of the primary conductor system, in particular at an angle of less than 50° relative to this direction. This has the advantage that sufficient voltage is induced in the first coil and/or the second coil at all times, in particular no less than a minimum component of the maximally inducible voltage. This makes it possible to achieve an uninterrupted energy supply when driving on a level surface.

In example embodiments, the vehicle has an energy store, so that the vehicle at times is also able to move independently of the primary conductor system. This has the advantage that the primary conductor system need not necessarily cover the entire floor surface, but only a portion thereof. For example, it suffices to install the primary conductor system in a floor area in a main driving range, whereas no primary conductor system is provided in the floor in a region seeing less traffic, or in a region a short distance from this main driving region.

In example embodiments, the vehicle has a position detection system, whose signals are supplied to control electronics of the vehicle, which in turn controls the drive of the vehicle, the path being determined, for example, such that the regions in which the primary conductor system is installed are taken into account, especially for carrying out energy-optimized transport operations within the system. This has the advantage that the path of the vehicle is controllable to the effect that an energy-optimized path is able to be selected. In particular, high driving power is ensured in the regions supplied by the primary conductor, and only low driving power in the other regions.

In example embodiments, the vehicle has a data exchange connection to a central computer of the system. This has the advantage that the paths are able to be determined centrally, or that the paths are able to be specified centrally. As an alternative, the vehicle determines its path itself and forwards its position, speed and estimated or specified path data, so that the central computer restricts the current value in the primary conductor system to a value that covers the requirements of the vehicle once it has entered the region supplied by this primary conductor.

In example embodiments, the vehicle has a track guidance system cooperating with the primary conductor system, and an anti-collision system. This has the advantage of also allowing track-guided movements, that is to say, track guides installed as primary conductors are able to be recognized for the vehicle orientation. In this way, track-guided driving as a function of need is made possible. Furthermore, it also allows a deviation from the track-guided region, which requires the track to be controlled in a different manner such as by a position-detection system or navigation system. Using track guidance, the vehicle is able to be guided very precisely across, or more precisely, between two primary conductors installed in the form of a line, which allows a uniform energy supply and thus avoids fluctuations such as in the transition between two primary conductors.

Besides being installed in a floor, an installation of the primary conductor system may be arranged on a ceiling, above the movement range of the vehicles. In addition, the primary conductor system may also be installed as a suspended system, that is to say, there is no need to provide it in encapsulated form.

LIST OF REFERENCE CHARACTERS 1 main limb
2 side limb
3 center limb
4 floor
5 primary conductor
w_1 partial coil
w_2 partial coil
w_3 partial coil
w_4 partial coil Example embodiments of the present invention are explained in greater detail with reference to the Figures.

DETAILED DESCRIPTION

A plurality of primary conductors is installed in the floor in elongated form. For example, this is easily realizable by installing a primary conductor cable in the floor in meander form.

The primary conductor structure may also be slightly curved or be adapted to the environment in some other manner. FIGS. 1 through 4 show a cross-section in this regard, the clearances of the primary conductors relative to each other being substantially constant. The current direction in adjacently installed primary conductors has an opposite direction. This results automatically, so to speak, in the mentioned meander-shaped installation of a cable.

A movably disposed vehicle, which includes the movably disposed component, is provided on the floor.

Figure 1:
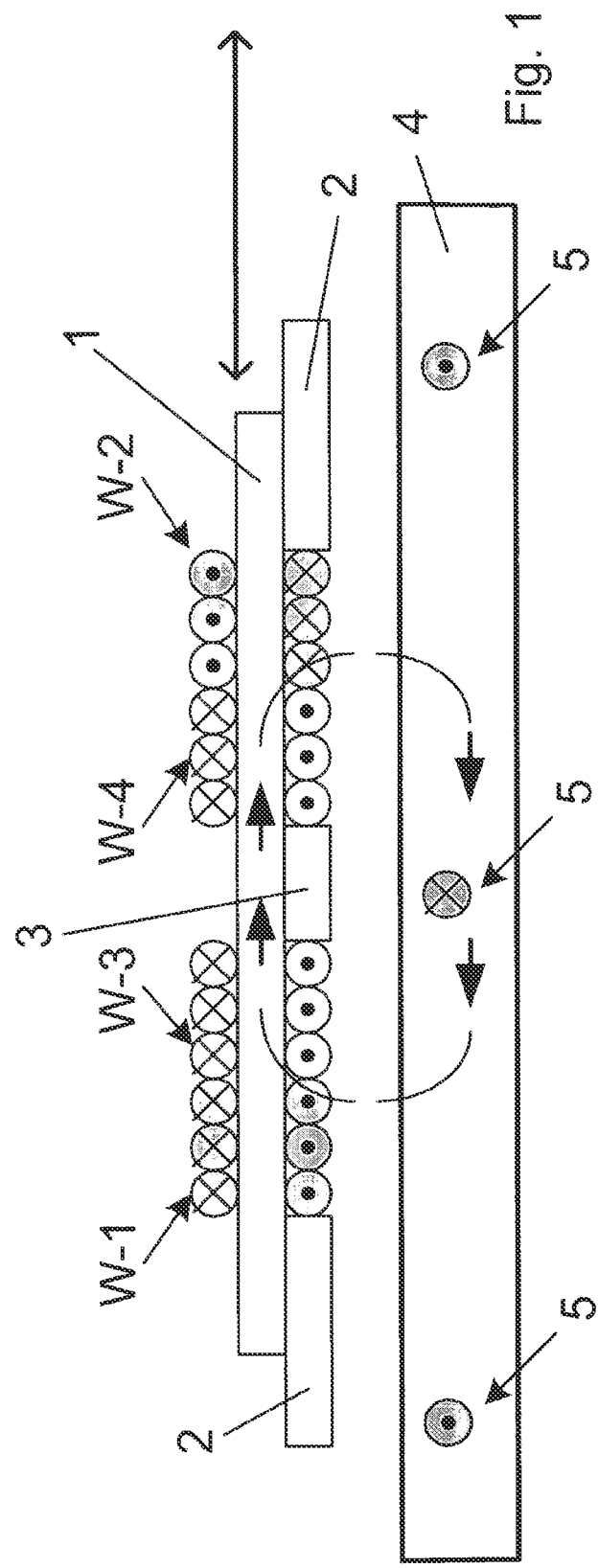
FIG. 1 schematically shows a first exemplary embodiment of the present invention, in a cross-section. A system, disposed above a floor 4 so as to allow movement, is shown with center limb 3 in a first position relative to primary conductors, which are installed in parallel and extend in floor 4.
Figure 2:
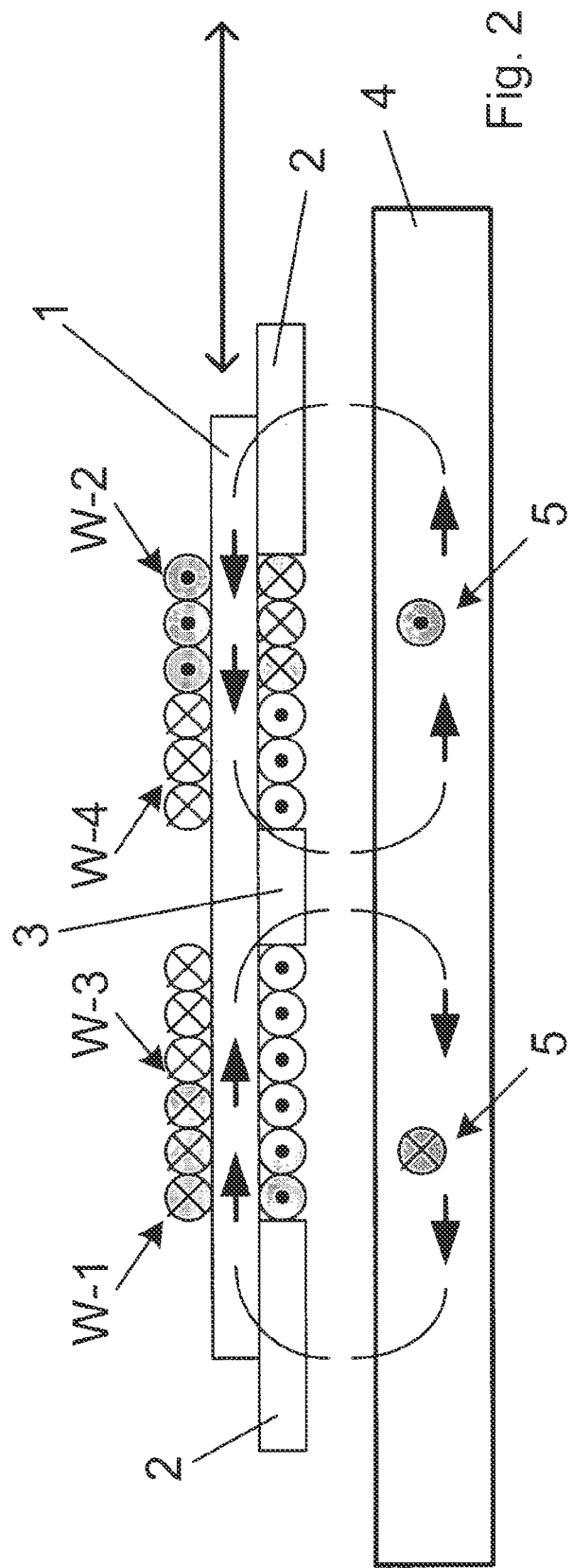
FIG. 2 shows the movably disposed component from FIG. 1 in a different position.

According to FIGS. 1 and 2, the movably disposed component has a coil core, made up of a plurality of parts, of a secondary coil, which includes a main limb 1 at whose external sides side limbs 2 pointing to the floor are provided, and a center limb 3 approximately in the middle, which is pointing the floor. Therefore, the basic cross-section of the coil core topologically corresponds to an E.

Figure 3:
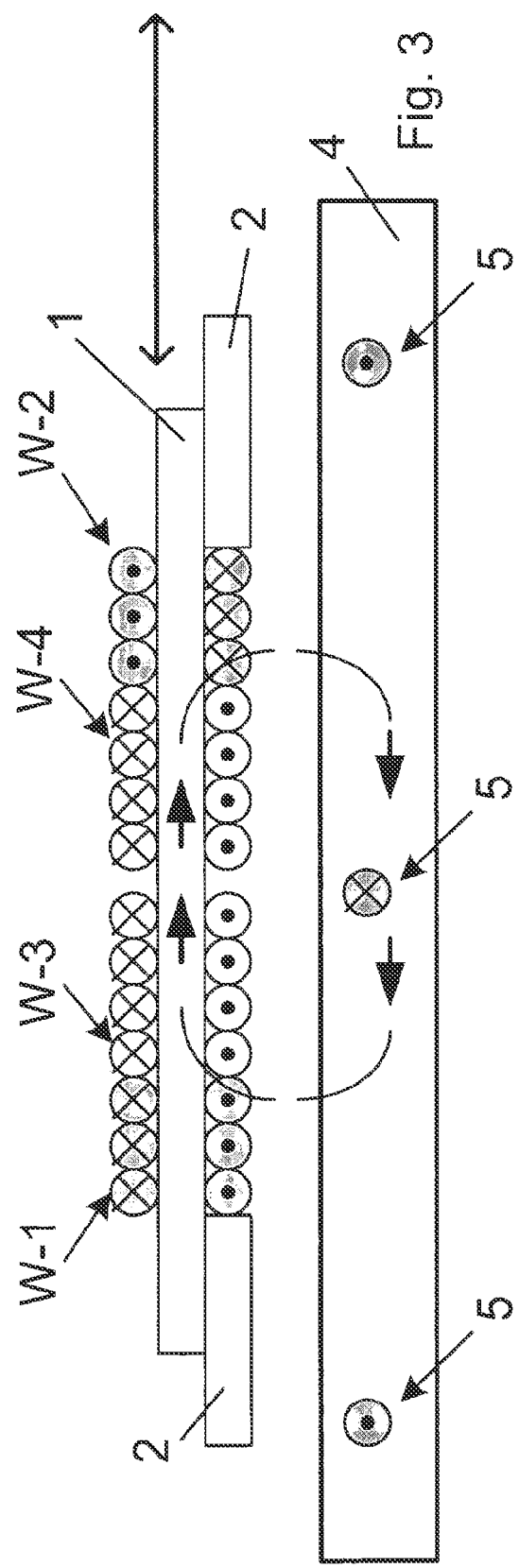
FIG. 3 schematically shows a second exemplary embodiment of the present invention, in a cross-section. Here, a system, disposed above a floor 4 so as to allow movement, is shown without center limb 3 in a first position relative to primary conductors, which are installed in parallel and extend in floor 4.
Figure 4:
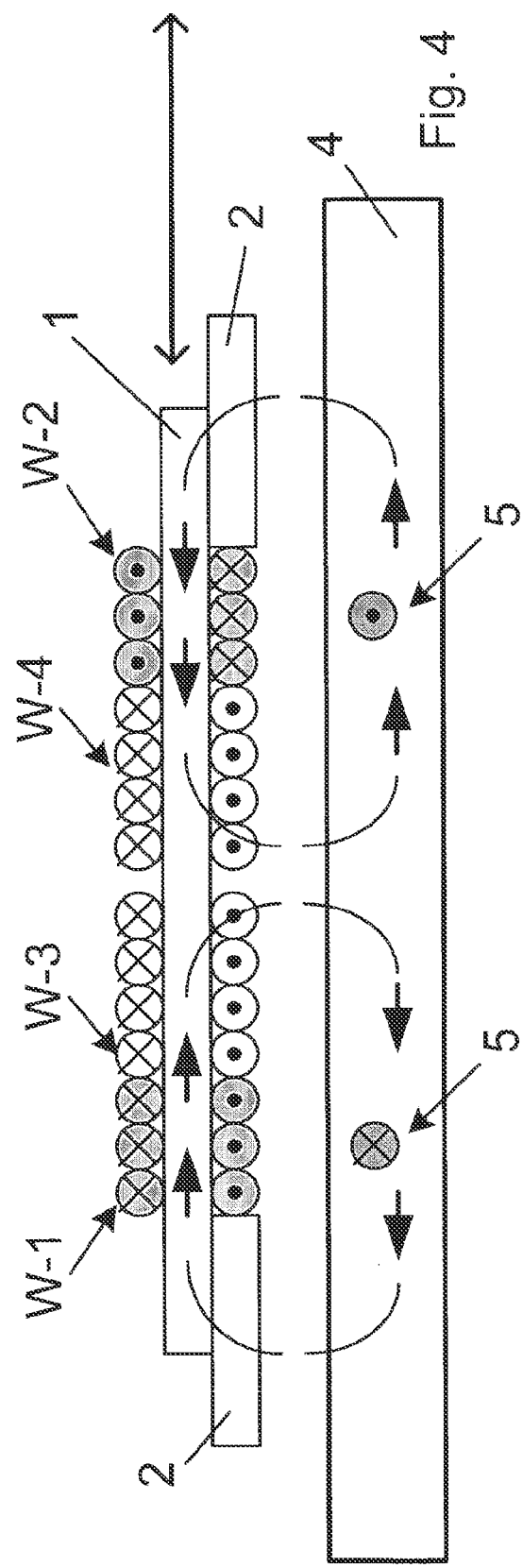
FIG. 4 shows the movably disposed component from FIG. 3 in another position.

As an alternative, a coil core according to FIGS. 3 and 4 is able to be implemented as well; here, center limb 3 is missing and the basic cross-section of the coil core thus topologically corresponds to an U. In analogous fashion, a C-shaped cross-section would be usable as well, C and U being considered similar.

Primary conductors 5 are installed in grooves in floor 4 and/or encapsulated.

The coil cores of the exemplary embodiments may also be implemented in one piece.

The secondary coil overall includes a first and a second coil, at least the second coil being made up of at least two partial coils.

The extension of the coil core in the direction of the primary conductors, that is to say, perpendicular to the drawing plane of FIGS. 1 through 4, defines the transmittable output and the efficiency to a considerably degree. It is advantageous to provide an extension large enough to let the coil core appear to have a disk shape when viewed from afar. The extension of side limbs 2 and/or center limb 3 in the direction of floor 4 thus should be selected much smaller than the extension of the coil core in the primary conductor direction.

The partial coils are implemented such that they encompass the flux routed through the main limb. Provided are the first core, which includes partial coils $w\_3$ and $w\_4$, and the second core, which includes partial coils $w\_1$ and $\_2$.

The first core is provided in the interior, that is to say, close to the center limb, partial coil $w\_3$ being provided in front of, and partial coil $w\_4$, behind the center limb.

Thus, when a homogeneous magnetic flux comes about, which may also be referred to as constant, in the main limb, as indicated in FIG. 1, its variation induces a voltage at partial coils $w\_3$ and $w\_4$. These partial coils $w\_3$ and $w\_4$ are connected in series to produce the first coil. Thus, voltage is induced also at the series connection. On the other hand, if the non-homogeneous magnetic flux according to FIG. 2 comes about in the main limb, no substantial voltage is induced at the series connection of partial coils $w\_3$ and $w\_4$. Here, a substantial portion of the flux enters the main limb, or exits therefrom, in the region of the center limb.

Surrounding the first coil, a second coil is situated at the main limb, which, given the non-homogeneous magnetic field according to FIG. 2, has an induction voltage because the two partial coils $w\_1$ and $w\_2$ are wound in opposite directions and thus are connected in series with respect to each other.

In other words, it is important that a first and a second coil are provided, the first having a uniform winding sense, and the second being made up of two partial coils ($w\_1$ and $w\_2$) which are connected in series and have an opposite winding sense. The two partial coils ($w\_1$, $w\_2$) are set apart from each other in the direction of main limb 1. As a result, voltage is inducible at the series connection of the partial coils ($w\_1$, $w\_2$), when the flux direction in the region of the main limb enclosed by the particular partial coil has a different orientation, especially an oppositely directed orientation.

Preferably, the first coil is disposed in the direction of the main limb, i.e., transversely to the primary conductor direction, but parallel to the floor or parallel to the plane defined by the primary conductors, between the partial coils of the second coil.

It is also possible, however, to provide the first coil in a manner shifted along the main limb. However, it preferably encloses the main limb and thus the magnetic flux within the main limb.

Instead of the two partial coils of the second coil, a plurality of partial coils may be provided and/or the first coil may be implemented in a plurality of partial coils.

In the exemplary embodiment according to FIGS. 3 and 4, the center limb has been omitted. In such an arrangement, as well, a voltage is induced when a substantially homogeneous, i.e., unidirected, flux is present in the main limb, in particular in the first coil, and when a non-homogeneous flux is present, i.e., a different flux direction in the region of the main limb enclosed by the partial coils of the second coil, voltage is induced in the main limb, in particular in the second coil.

In other words, the secondary coil supplies an induction voltage in the manner described when the vehicle moves within the plane and, for instance, changes from a first track where it follows a first installed primary conductor, to a second track where it follows a second installed primary conductor.

Thus, the vehicle is able to be inductively supplied from a primary conductor system and not restricted in its movements to following a single primary conductor, i.e., restricted to executing only a one-dimensional movement, in order to keep the vehicle electrically supplied.

A power supply impresses a medium frequency alternating current on the primary conductor system.

The frequency is between 10 and 500 kHz in this case. The primary conductor system is implemented as individual conductor loop.

However, a plurality of vehicles is able to be supplied simultaneously. For this purpose each vehicle includes a secondary coil, which is inductively coupled to the primary conductor system as long as the vehicle stays in the installation region of the primary conductor system. The vehicle includes electrical consumers such as a drive, which are supplied from the secondary coil. In addition, an energy store such as a battery or a hoisting gear having a rectifier motor drive capable of energy recovery may be provided as well, for the intermediate storage and/or buffering of energy.

A capacity is connected to the secondary coil, in series or in parallel, such that the associated resonant frequency essentially corresponds to the medium frequency of the current impressed on the primary conductor system.

The power supply includes a rectifier, whose input side is a unipolar voltage, in particular an intermediate circuit voltage, which is suppliable, by rectification, from the supply network, preferably a three-phase voltage system. The rectifier is able to be operated in pulse-width modulated manner and, on the output side, represents a preferably sinusoidal voltage source, which feeds a voltage-current-converting quadripole, especially a gyrator, which thus behaves like a current source on the output side.

This quadripole supplies the primary conductor circuit implemented as conductor loop, either directly or, as an alternative, via a transformer, it also being adapted to the medium frequency in that corresponding capacities are connected in parallel or in series to the path inductivity of the primary conductor circuit.

The quadripole, in particular gyrator, has inductivities and capacities such that the associated resonant frequency essentially corresponds to the medium frequency.

By controlling the amplitude of the sinusoidal voltage generated at the rectifier on the output side, it is possible to set the amplitude of the current source that supplies the primary conductor circuit.

In each case the power supply includes control electronics for generating the pulse-width-modulated control signals for the rectifier. In addition, the control electronics include means for exchanging data with a superposed control, the control being implemented as field bus stations, in particular.

Figure 5:
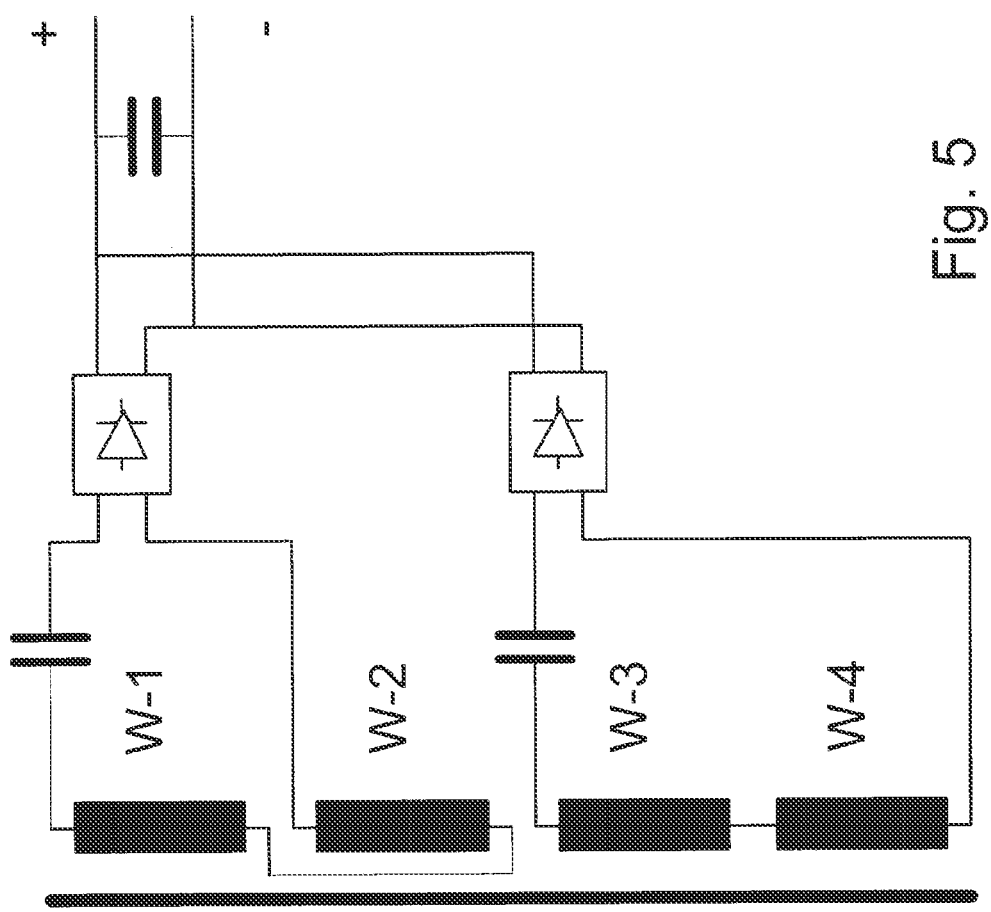
FIG. 5 shows a circuit diagram for the secondary side.

FIG. 5 shows that the first and second core are compensated separately in each case, that is to say, are connected in series with a particular capacity. The capacity is dimensioned such that the associated resonant frequency essentially corresponds to the frequency of an, or the, alternating current impressed on the primary conductor. Preferably, a frequency between 10 and 500 kHz is provided for this purpose. The system feeding the primary conductor, i.e., the power supply, has a controllable voltage source, which includes a rectifier operated in pulse-width modulated fashion, to which a gyrator is post-connected, i.e., a voltage-current converter. In this manner, the primary conductor system essentially constitutes a current source. From the gyrator, a conductor loop is supplied as primary conductor system, to which a capacity adapted to the resonant frequency is connected in turn. The conductor loop is installed in meander form in the floor, in particular in encapsulated form.

The invention claimed is:

1. A system, comprising:
   at least one vehicle;
   a primary conductor system; and
   a secondary coil for inductive supply of the vehicle from the primary conductor system;
   wherein the secondary coil includes a coil core, which has at least one main limb having an axis, the secondary coil being made up of a first and second coil, which are formed of windings which enclose a main limb in each case by winding around the axis,
   wherein the first coil is arranged such that windings are connected in series, and an induction voltage arising at the first coil corresponds to a sum of individual voltages induced at all windings when a magnetic flux enclosed by an individual winding in the main limb always has a same direction;
   wherein the second coil is composed of a first type of windings and of a second type of windings, the windings connected in series, and an induction voltage arising at the second coil corresponds to a difference of a summation voltage of all individual voltages induced at the windings of the first type, and to a summation voltage of all individual voltages induced at the windings of the second type, when a magnetic flux enclosed by an individual winding in the main limb always has a same direction, wherein the second coil surrounds the first coil, and wherein the first type of windings of the second coil and the second type of windings of the second coil are wound in opposite directions from each other and connected in series with respect to one another.

2. The system according to claim 1, wherein the coil core has a center limb pointing toward one of a floor and a ceiling.

3. The system according to claim 1, wherein the first type of windings corresponds to a first partial coil and the second type of windings corresponds to a second partial coil, and wherein the first partial coil and the second partial coil of the second coil are set apart from one another in a direction of the main limb.

4. The system according to claim 1, wherein the first type of windings corresponds to a first partial coil and the second type of windings corresponds to a second partial coil, wherein a center limb is arranged between the first and second partial coils of the second coil, and wherein the center limb points toward a floor.

5. The system according to claim 1, wherein side limbs are arranged at ends of the main limb such that the coil core has one of (a) an E-shape, (b) a C-shape, and (c) a U-shape, a open side pointing toward a floor.

6. The system according to claim 1, wherein the first coil includes at least two partial coils.

7. The system according to claim 1, wherein the first type of windings corresponds to a first partial coil and the second type of windings corresponds to a second partial coil, and wherein at least one of (a) the first and (b) the second partial coil of the second coil includes at least two partial coils.

8. The system according to claim 1, wherein the first type of windings corresponds to a first partial coil and the second type of windings corresponds to a second partial coil, and wherein the first and the second partial coil of the second coil are arranged in identical size and have a same number of windings.

9. The system according to claim 1, wherein the secondary coil is compensated by a capacity, connected in series, such that an associated resonant frequency corresponds to a frequency of an alternating current impressed on the primary conductor.

10. The system according to claim 1, wherein the first type of windings corresponds to a first partial coil and the second type of windings corresponds to a second partial coil, and wherein the first and second partial coils are provided in individually compensated form.

11. The system according to claim 1, wherein the vehicle is movable moved along a primary conductor of the primary conductor system at an angle of less than 50.degree. relative to a direction of movement.

12. The system according to claim 1, wherein the vehicle includes an energy store, so that the vehicle at times is movable independently of the primary conductor system.

13. The system according to claim 1, wherein the vehicle includes a position detection system, whose signal is suppliable to control electronics of the vehicle, which controls a drive of the vehicle, a path being determined, in a manner that takes into account regions in which the primary conductor system is installed, for energy-optimized execution of transport operations within the system.

14. The system according to claim 1, wherein the vehicle includes a data exchange connection to a central computer of the system.

15. The system according to claim 1, wherein the vehicle includes a track guidance system cooperating with the primary conductor system, and an anti-collision system.

16. The system according to claim 1, wherein the coil core includes the main limb and omits a center vertical limb.

\* \* \* \* \*